(No Model.) 2 Sheets—Sheet 1.
A. N. NORRIS.
GRAIN DRILL.
No. 293,062. Patented Feb. 5, 1884.
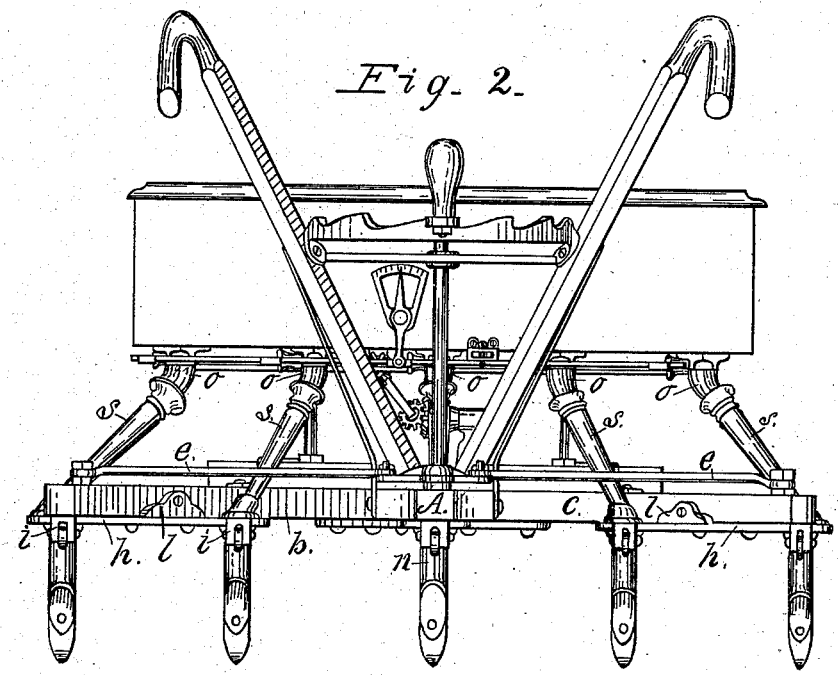
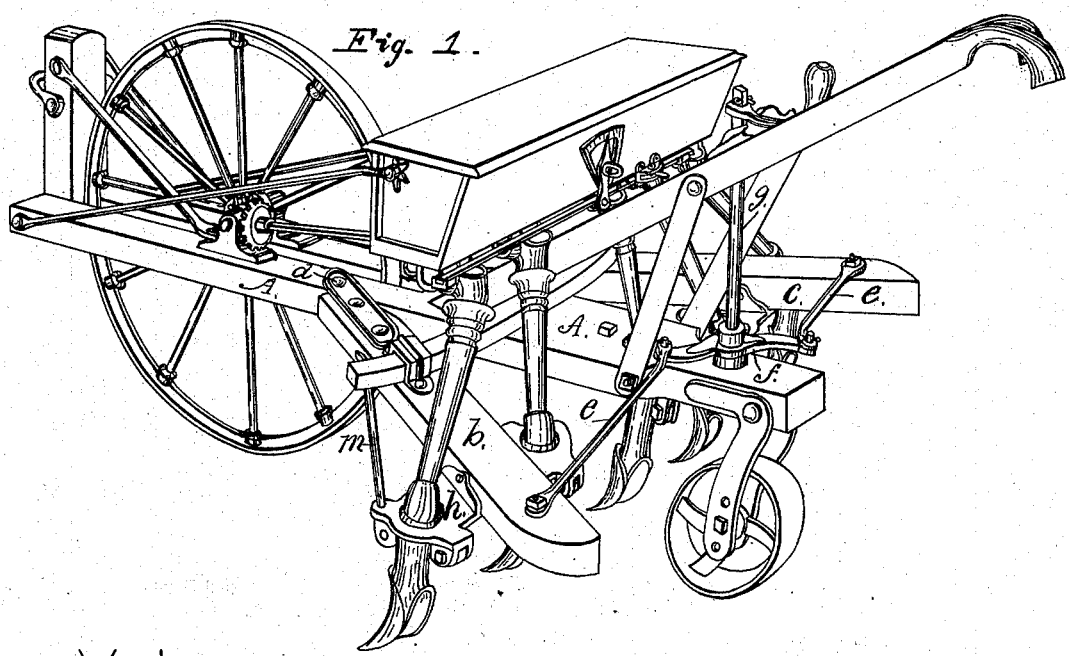
WITNESSES:
Harrison D. Spangler
Walter L. Kemp
INVENTOR:
Albert N. Norris (No Model.)  
2 Sheets—Sheet 2.
A. N. NORRIS.
GRAIN DRILL.
No. 293,062.  Patented Feb. 5, 1884.
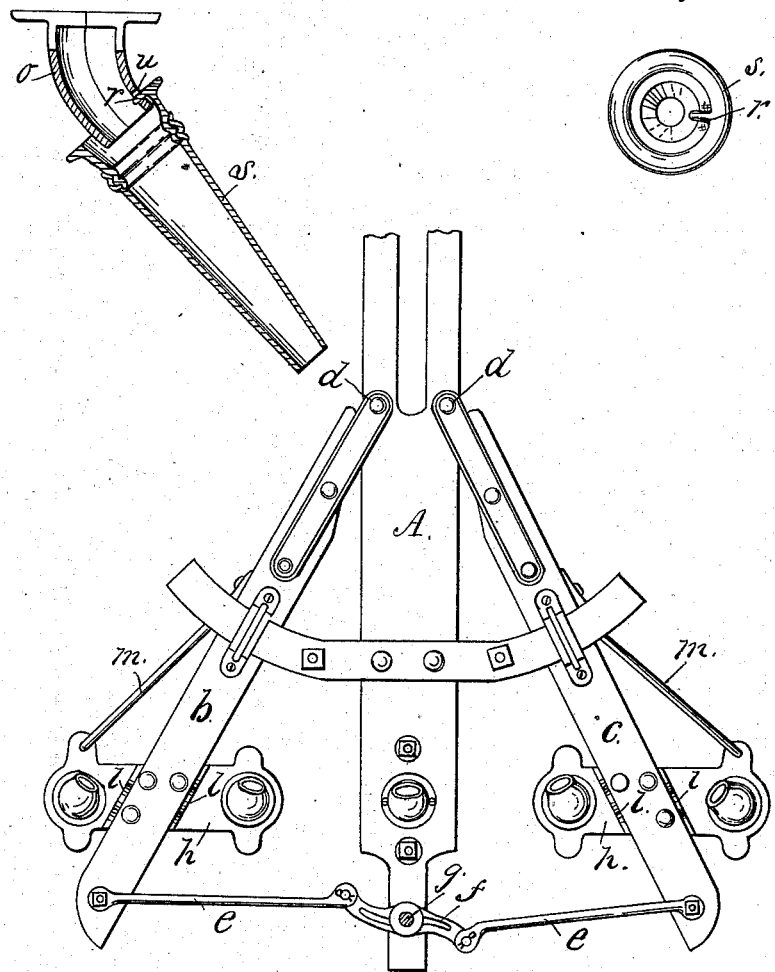
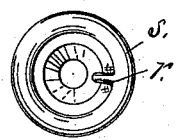
WITNESSES:  
Harrison W. Spangler.  
Walter L. Kemp.
INVENTOR:  
Albert N. Norris

UNITED STATES PATENT OFFICE.

ALBERT N. NORRIS, OF RUSHVILLE, INDIANA.

GRAIN-DRILL.

SPECIFICATION forming part of Letters Patent No. 293,062, dated February 5, 1884.

Application filed August 14, 1883. (No model.)

*To all whom it may concern:*

Be it known that I, ALBERT N. NORRIS, a citizen of the United States, residing at Rushville, in the county of Rush and State of Indiana, have invented a new and useful Improved Grain-Drill, of which the following is a specification.

My invention relates to improvements in that class of grain-drills which are designed to be drawn by one horse, are used ordinarily for planting wheat between rows of corn, and in which a portion of the drill-hoes are mounted on radial wings hinged to a central draft-beam, which wings are adjustably connected at their free ends with the central beam, so as to cover a greater or less width of ground surface. In this class of grain-drills as heretofore constructed the drill-hoes have been placed in the radial wings in two rows or series, one hoe being placed near the free end of each wing, and one in the central beam in line therewith, and one also in each wing nearer the hinged end, the hoes being hollow and receiving the seed through a perforation in the wing. With this construction it has been found that the row of hoes nearest the hinged end of the wings are hidden from the view of the person guiding the machine, and are difficult of access when they become clogged with trash, that the hoes of the rear line or series cover to too great a depth the grain sown by the forward hoes, and that the forward hoes form a fulcrum on which the machine vibrates from side to side, making it difficult to guide. It has also been found that the outside rear hoes, when placed under a central perforation in the wings, cannot be brought so near the standing corn as is desirable.

The objects of my improvements are, first, to provide means for securing the hoes to the radial wings, so that the hoes are brought into one row or series at the rear end of the machine, and that the outside hoes of said row may be run close to a corn-row without interfering with the standing corn; second, to avoid the necessity for perforating the wings for the passage of the seed to the hoes; third, to provide an improved means for attaching the seed-spouts to the feed-cups.

The accompanying drawings illustrate my invention.

Figure 1 is a perspective view of my wheat-drill from the rear. Fig. 2 is a rear elevation with the depth-gage removed. Fig. 3 is a partial plan with the seed-box removed. Fig. 4 is a longitudinal section of a seed-spout and a portion of a feed-cup. Fig. 5 is an end elevation of the mouth of the seed-tube.

Like letters indicate the same parts in all the views.

A is the central draft-beam, to which the radial wings $b$ $c$ are hinged at $d$ $d$. The free ends of the wings $b$ $c$ are adjustably connected with the central beam, A, by the rods $e$ $e$, pivot-bar $f$, and vertical shaft $g$ in the usual well-known manner.

For the purpose of securing the drill-hoes to the radial wings $b$ and $c$, I provide a plate, $h$, for each wing. Said plate $h$ is provided on the under side with means for securing thereto a pair of hoes of the ordinary form hinged at the rear side, as at $i$, and secured by a break-pin in front in the usual manner. The hoes are placed one at each end of the plate, and the plate is perforated and provided with receiving-cups V V, one over each hoe. Plates $h$ are secured, each to its respective wing, centrally between the hoes by bolts through flanges $l$ $l$, or in any other suitable manner, the plate crossing the wing diagonally at such an angle that the hoes on the two wings form a line nearly or quite at right angles with the central draft-beam, A. By this construction no part of the machine extends sidewise beyond the outside hoes, which can consequently be guided close to the standing corn. A brace, $m$, on each side also serves as a fender to prevent the ends of plates $h$ from catching in the corn. A drill-hoe, $n$, is secured to the central beam, A, in the usual manner and in line with the hoes on the wings. The drill-hoes are all in one line, which may be extended or contracted to suit different widths between rows of corn, and, being at the rear of the machine, are easily seen at all times and cleared when clogged. There being no bearing-point between the carrying-wheel and the hoes, there is no tendency to swing from side to side. The seed is conducted from the feed-boxes $o$ $o$ $o$ $o$ to the receiving-cups in plates $h$ by removable spouts $s$ $s$. The lower ends of said spouts are inserted in said cups, and the upper ends are made flaring and somewhat larger than the ends of the feed-boxes, and are secured thereto in the following manner: A pin, r, Figs. 4 and 5, is cast or otherwise formed in the flaring mouth of the tube. Said pin projects inward from the edge of the mouth of the spout, and is adapted to enter a hole, u, made in the side of the feed-box. The space between the inner end of pin r and the opposite side of the mouth of the spout is equal to the diameter of the feed-box.

By constructing the seed-spout in the above-described manner—that is, with a short pin cast to or otherwise permanently secured to one side only of the interior of its flaring mouth—the spout is attached to the feed-box in a manner which allows it to swing from side to side, and also backward and forward, and thus to follow easily without cramping the radial swinging movement of the radial wing, which carries the hoes, and it can be instantly attached or detached, there being no loose separate pin.

I claim as my invention—

1. In a grain-drill, the combination, substantially as shown and described, of plate h, having receiving-cups V V, and secured diagonally across radial wing b, and a pair of drill-hoes secured to the under side of said plate.

2. In a grain-drill, the combination of a grain-feed box having a hole in one side and a swinging spout having a flaring mouth provided on one side only with a short inwardly-projecting pin engaging said hole in said feed-box, all substantially as shown and described.

ALBERT N. NORRIS.

Witnesses:
HARRISON D. SPANGLER,
WALTER L. KEMP.